(12) United States Patent
Ozinga

(10) Patent No.: US 10,017,097 B2
(45) Date of Patent: Jul. 10, 2018

(54) MOBILE TRANSFER STATION FOR FLOWABLE MATERIAL

(71) Applicant: Ozinga Ready Mix Concrete, Inc., Mokena, IL (US)

(72) Inventor: Justin A. Ozinga, Frankfort, IL (US)

(73) Assignee: OZINGA READY MIX CONCRETE, INC., Mokena, IL (US)

( * ) Notice: Subject to any disclaimer, the term of this patent is extended or adjusted under 35 U.S.C. 154(b) by 0 days.

(21) Appl. No.: 15/484,179

(22) Filed: Apr. 11, 2017

(65) Prior Publication Data

US 2017/0327024 A1 Nov. 16, 2017

Related U.S. Application Data

(60) Provisional application No. 62/333,968, filed on May 10, 2016.

(51) Int. Cl.
| B60P 3/16 | (2006.01) |
| B60P 1/28 | (2006.01) |
| B60P 1/36 | (2006.01) |
| B65G 11/12 | (2006.01) |
| B65G 11/20 | (2006.01) |
| B65G 21/10 | (2006.01) |
| B65G 11/02 | (2006.01) |

(52) U.S. Cl.
CPC ............... *B60P 3/16* (2013.01); *B60P 1/286* (2013.01); *B60P 1/36* (2013.01); *B65G 11/026* (2013.01); *B65G 11/126* (2013.01); *B65G 11/20* (2013.01); *B65G 21/10* (2013.01)

(58) Field of Classification Search
CPC .... B60P 3/16; B60P 1/286; B60P 1/36; B65G 11/026; B65G 11/126; B65G 11/20; B65G 21/10
See application file for complete search history.

(56) References Cited

U.S. PATENT DOCUMENTS

| 496,163 | A | * | 4/1893 | Lebach | B60P 1/56 105/377.09 |
| 2,636,628 | A | * | 4/1953 | Prang | B60P 1/16 414/489 |
| 3,185,450 | A | * | 5/1965 | Duecy | E04G 21/04 366/46 |
| 3,575,308 | A | * | 4/1971 | Moon | B60P 1/36 414/489 |
| 3,700,283 | A | * | 10/1972 | Birdsall | B60P 1/04 298/18 |

(Continued)

*Primary Examiner* — Kaitlin S Joerger
(74) *Attorney, Agent, or Firm* — Peter J. Van Bergen

(57) ABSTRACT

A flowable-material transfer station includes a mobile frame and a conveyor coupled thereto. A hopper mounted on the mobile frame has a side wall with an opening. A chute's loading end is rigidly coupled to the hopper at the side wall opening thereof wherein the chute is in fluid communication with the hopper via the opening. The hopper is hingedly coupled to the mobile frame and the chute's dispensing end is positioned over a first end of the conveyor. A lift mechanism is provided to move the hopper between a lowered position and a raised position. The chute's dispensing end is above the chute's loading end when the hopper is in its lowered position, and is below the chute's loading end when the hopper is in its raised position.

32 Claims, 8 Drawing Sheets

(56) References Cited

U.S. PATENT DOCUMENTS

| | | | | |
|---|---|---|---|---|
| 3,719,298 A | * | 3/1973 | Brown | B60P 1/36 |
| | | | | 414/489 |
| 3,844,617 A | * | 10/1974 | Kostman | A01D 90/12 |
| | | | | 298/11 |
| 3,923,175 A | * | 12/1975 | Landvatter | B60P 1/36 |
| | | | | 193/4 |
| 4,059,195 A | * | 11/1977 | MacDonald | B65G 67/24 |
| | | | | 222/166 |
| 4,483,650 A | | 11/1984 | Sims | |
| 5,044,867 A | * | 9/1991 | Pettijohn | B60P 1/36 |
| | | | | 198/313 |
| 5,190,432 A | * | 3/1993 | Gerow | B60P 1/16 |
| | | | | 198/317 |
| 5,193,971 A | * | 3/1993 | Pettijohn | B60P 1/36 |
| | | | | 198/317 |
| 6,227,608 B1 | * | 5/2001 | Hoyne | B60J 7/1621 |
| | | | | 296/100.1 |
| 6,938,960 B1 | * | 9/2005 | Eby | B60J 7/1621 |
| | | | | 298/23 C |
| 8,182,045 B2 | * | 5/2012 | Rogers | B60P 1/165 |
| | | | | 296/100.1 |
| 8,876,217 B1 | * | 11/2014 | Medlen | B60P 1/286 |
| | | | | 296/100.1 |
| 2006/0104774 A1 | * | 5/2006 | Sessler, Jr. | B65D 88/123 |
| | | | | 414/539 |

* cited by examiner

MOBILE TRANSFER STATION FOR FLOWABLE MATERIAL

Pursuant to 35 U.S.C. § 119, the benefit of priority from provisional application 62/333,968, with a filing date of May 10, 2016, is claimed for this non-provisional application.

FIELD OF THE INVENTION

The invention relates generally to material handling, and more particularly to a mobile transfer station that facilitates the transfer of a flowable material such as concrete from dump trucks to ready mix trucks at a job site.

BACKGROUND OF THE INVENTION

Wet or plastic concrete is delivered to a job site by a ready mix truck or by a dump truck. Both types of trucks have their advantages and disadvantages. Ready mix trucks simultaneously mix and transport wet concrete to a job site. A ready mix truck can be loaded with pre-mixed materials or dry materials and water. In either case, the materials are maintained in a liquid state as the ready mix truck's drum is rotated. Once at the job site, ready mix trucks disperse the wet concrete in a fairly precise fashion where it is needed. Unfortunately, the cost and frequent limited-availability of ready mix trucks can negatively impact a job's budget and production schedule.

Using dump trucks to deliver wet concrete to a job site provides several advantages compared to the use of ready mix trucks. First, dump trucks have a greater payload than ready mix trucks. Second, dump trucks are plentiful in the marketplace thereby generally assuring sufficient availability even for large jobs. Third, dump trucks are less expensive to own/operate than ready mix trucks thereby making them preferable from a cost perspective. However, dump trucks are not equipped for the precise dispensing of wet concrete thereby complicating their use at a job site. Furthermore, dump trucks are not equipped for adjusting or mixing a concrete mixture while the concrete is being transported. As a result, the viscosity changes experienced by wet concrete being transported by dump trucks to a job site can negatively impact the concrete's workability during placement at the job site.

SUMMARY OF THE INVENTION

Accordingly, it is an object of the present invention to provide an apparatus that facilitates transfer of a bulk flowable material such as wet concrete to improve handling operations.

Another object of the present invention is to provide an apparatus that facilitates the use of dump trucks for delivery of wet concrete to a job site.

Still another object of the present invention is to provide an apparatus that can readily be transported to a job site to facilitate efficient wet concrete delivery to the job site and wet concrete dispensing at the job site.

Other objects and advantages of the present invention will become more obvious hereinafter in the specification and drawings.

In accordance with the present invention, a mobile transfer station for flowable material includes a mobile frame and a conveyor having a first end coupled to the mobile frame and having a second end. A hopper having an open top is mounted on the mobile frame. The hopper has a side wall with an opening passing there through. An open-ended chute has a loading end and a dispensing end. The loading end is rigidly coupled to the hopper at the side wall opening thereof wherein the chute is in fluid communication with the hopper via the opening. The hopper is hingedly coupled to the mobile frame along a hinging axis and the dispensing end of the chute is positioned over the first end of the conveyor. A lift mechanism coupled to the mobile frame and the hopper is provided to move the hopper between a lowered position and a raised position such that a combination of the hopper and the chute rotate in unison about the hinging axis. The dispensing end of the chute is above the loading end of the chute when the hopper is in its lowered position. The dispensing end of the chute is below the loading end of the chute when the hopper is in its raised position.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
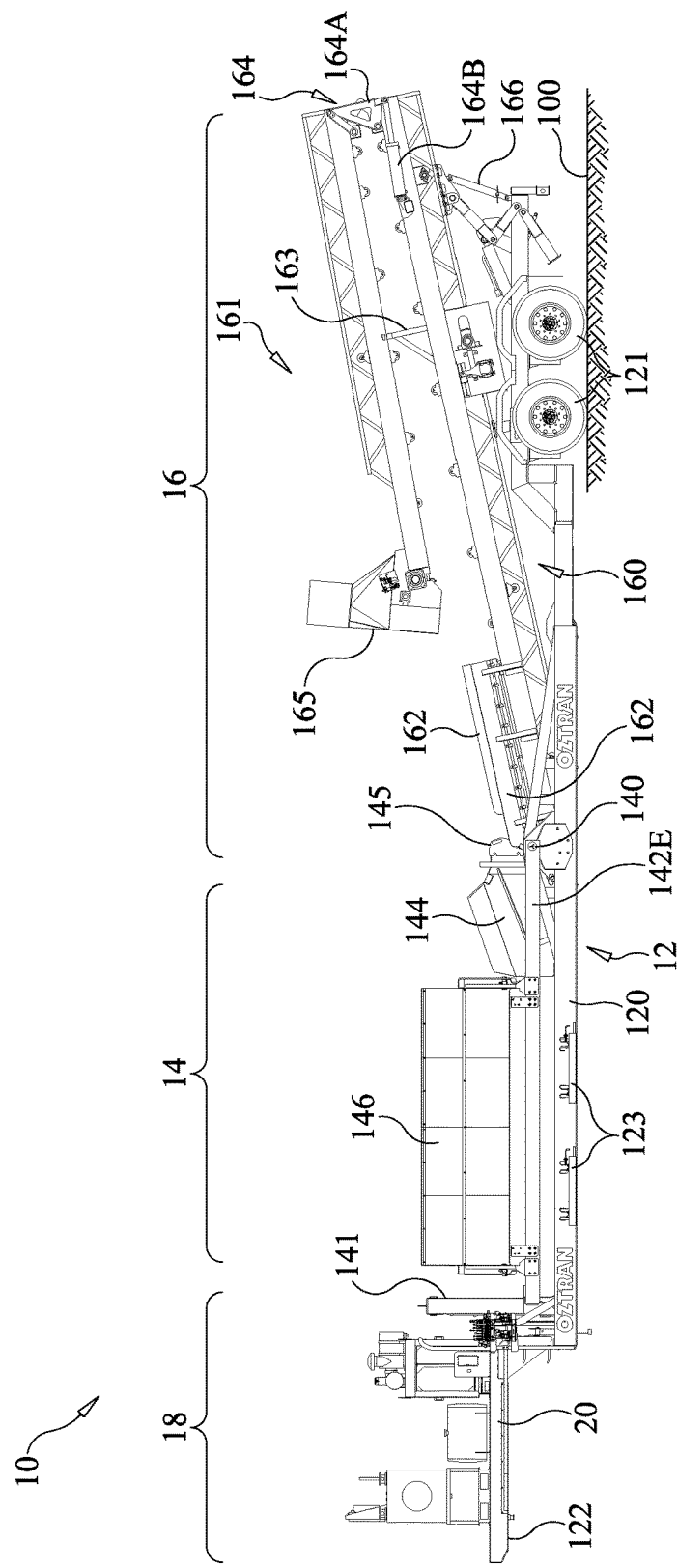
FIG. 1 is a side view of a mobile transfer station in a transport-ready configuration in accordance with an embodiment of the present invention.
Figure 2:
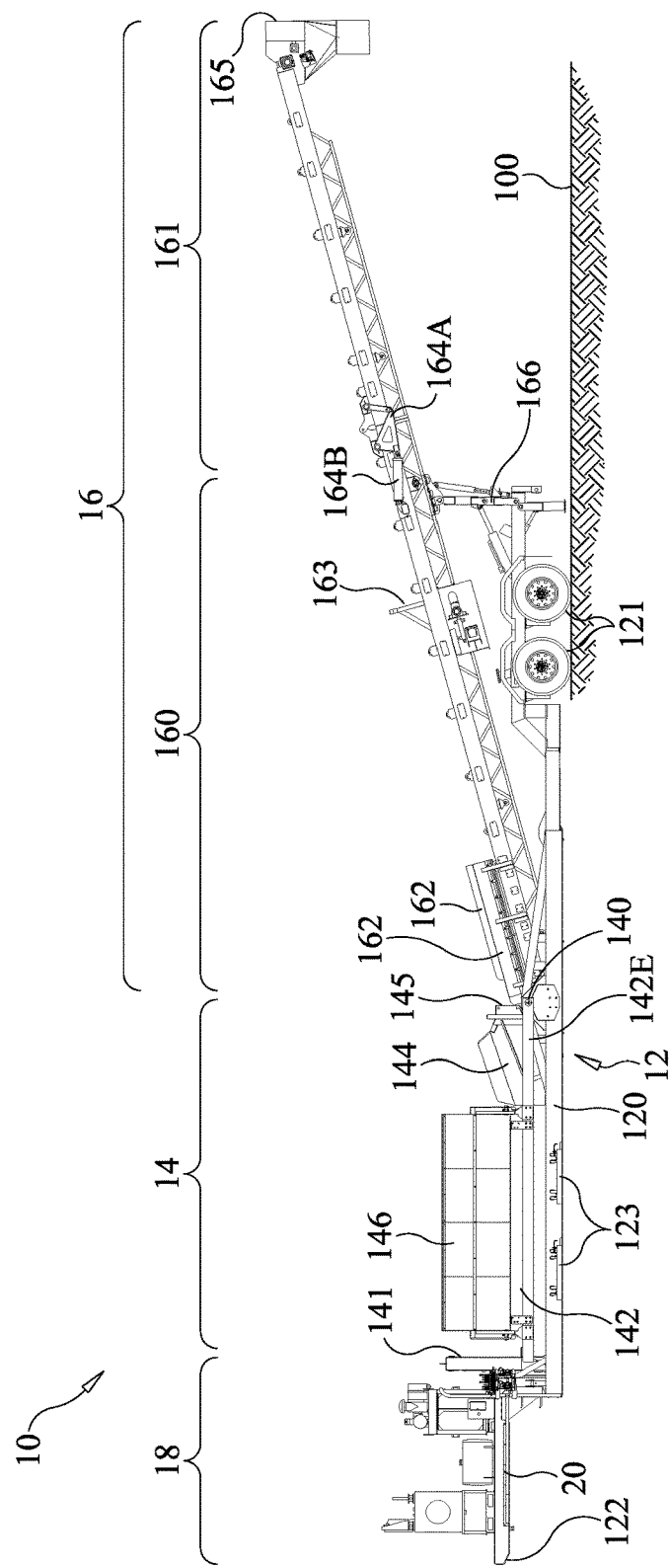
FIG. 2 is a side view of the mobile transfer station in a site-ready configuration.
Figure 3:
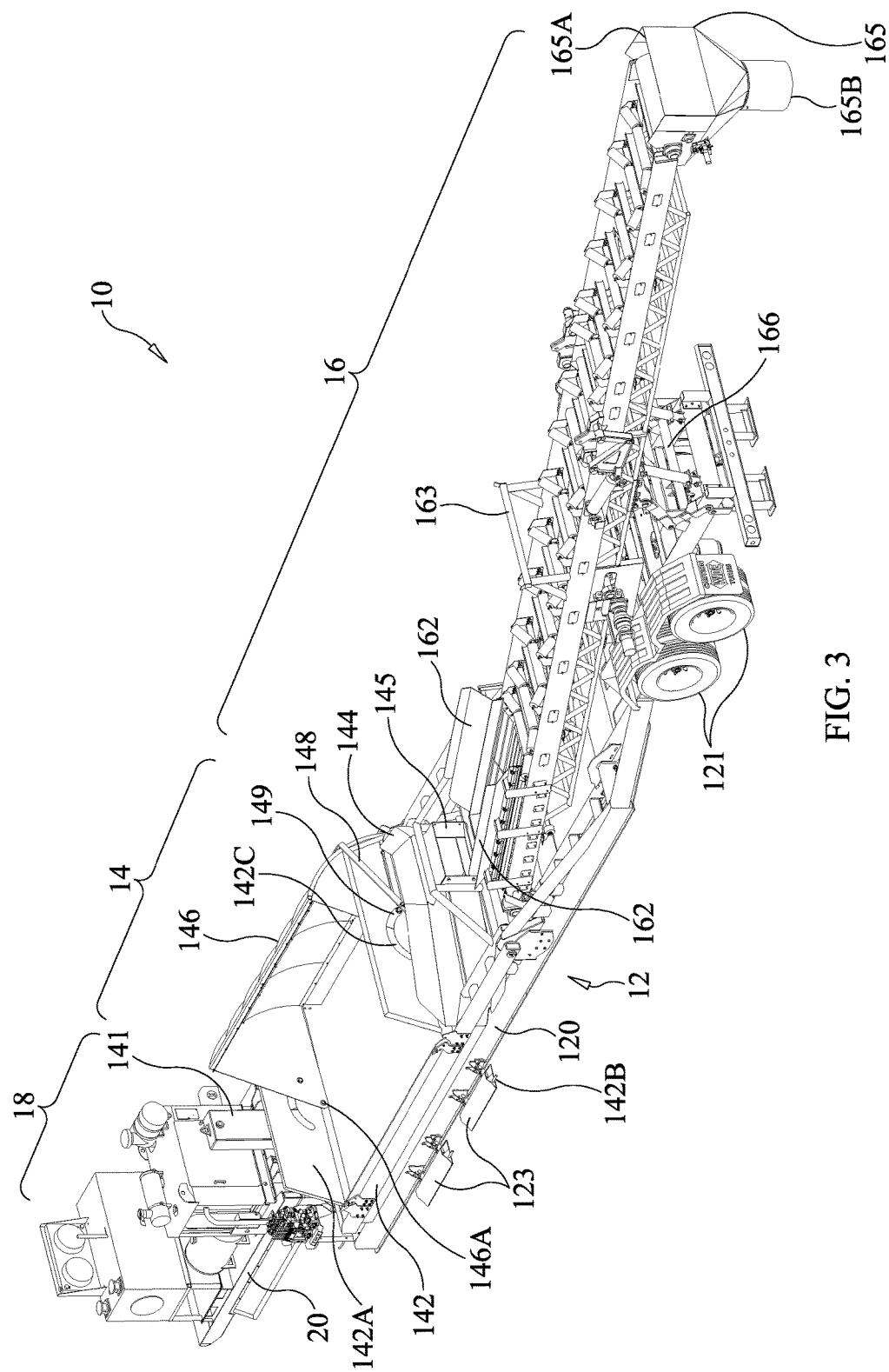
FIG. 3 is a perspective view of the mobile transfer station in a site-ready configuration.
Figure 4:
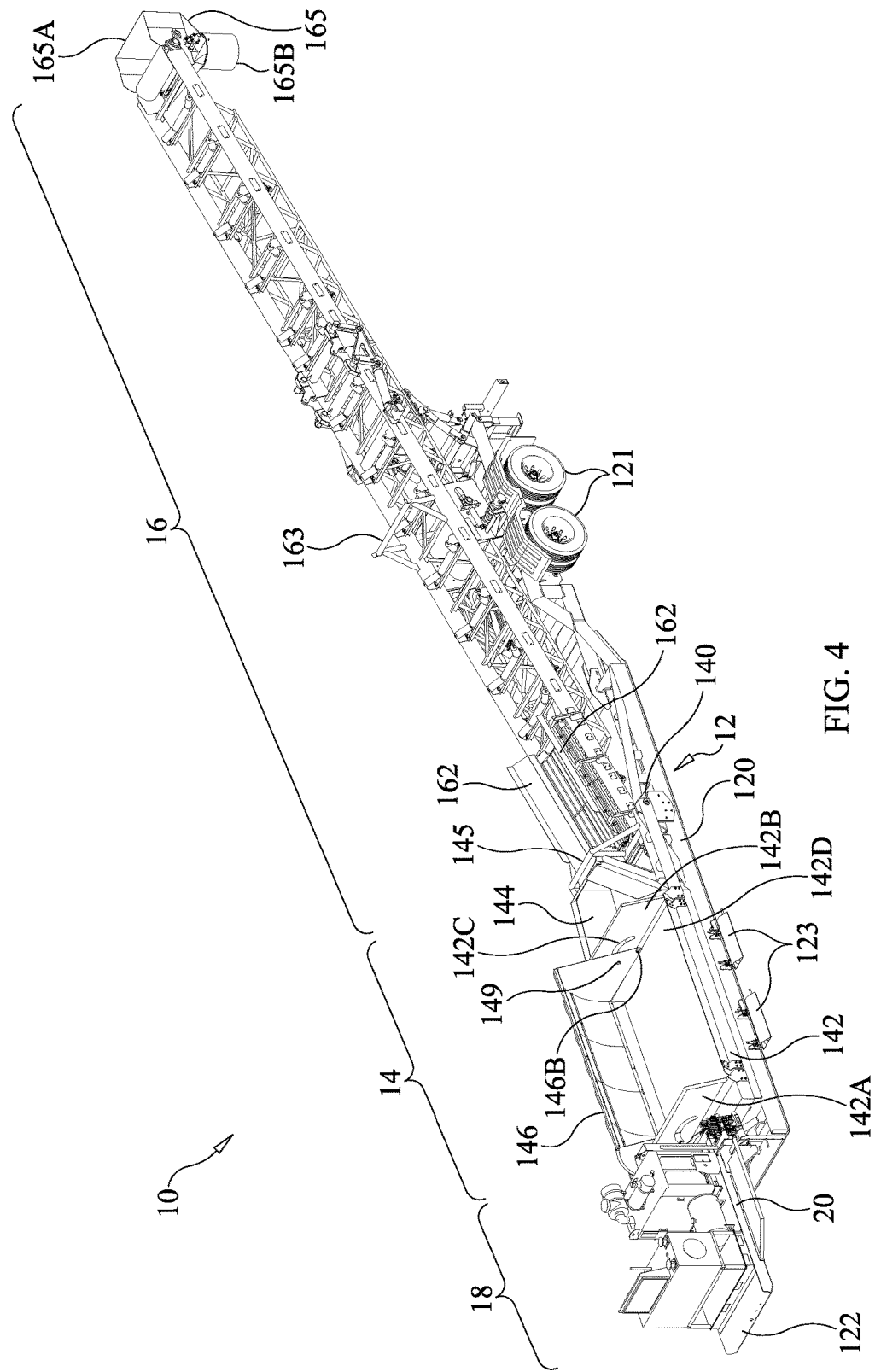
FIG. 4 is another perspective view of the mobile transfer station in a site-ready configuration.
Figure 5:
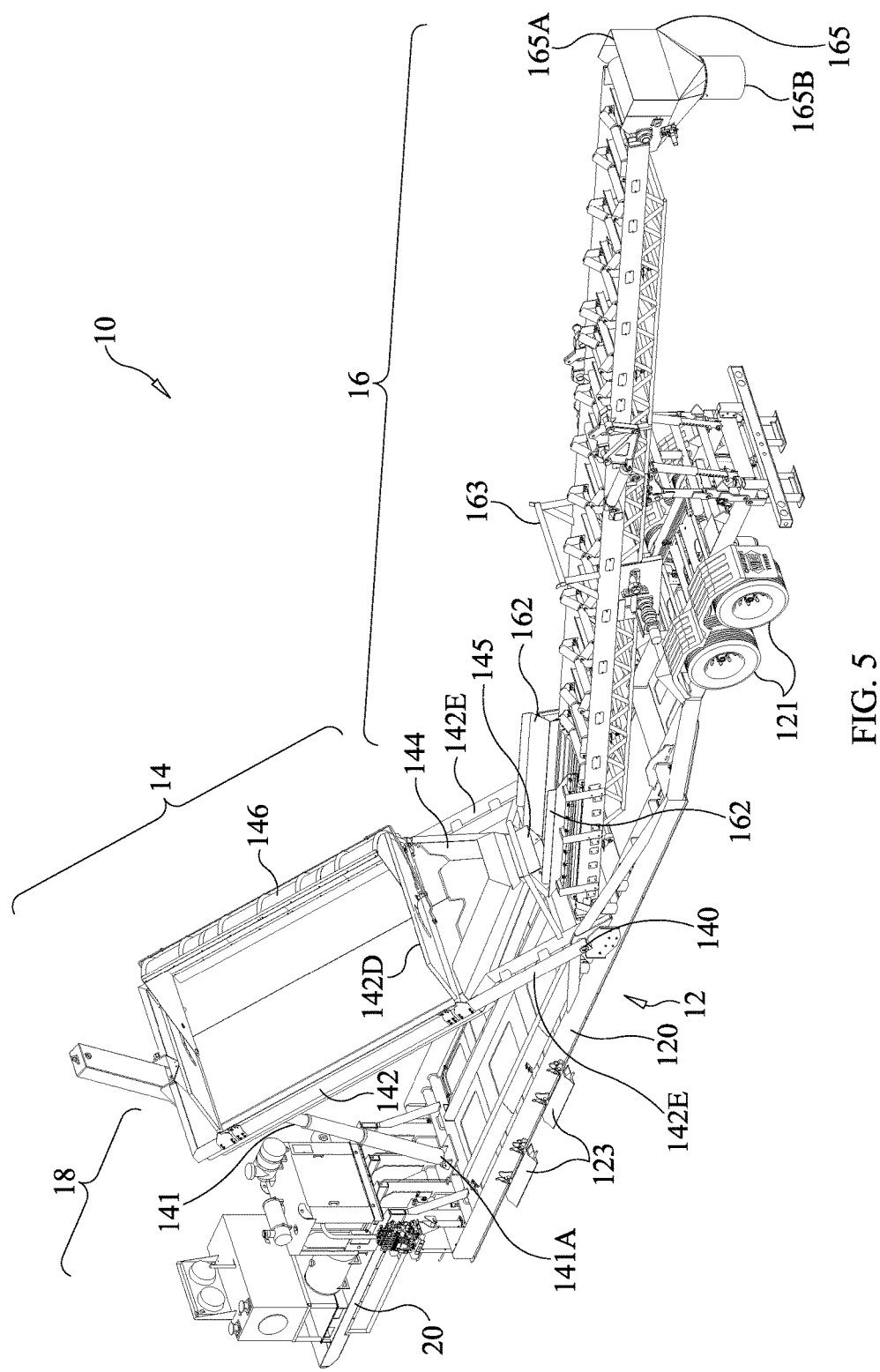
FIG. 5 is a perspective view of the mobile transfer station in an off-loading configuration.

Referring now to the drawings, simultaneous reference will be made to FIGS. 1-5 where a mobile transfer station in accordance with an embodiment of the present invention is shown and is referenced generally by numeral 10. Mobile transfer station 10 will be referred to as "MTS 10" hereinafter. FIG. 1 illustrates MTS 10 in its transport-ready configuration, FIGS. 2-4 illustrate MTS 10 in its site-ready configuration, and FIG. 5 illustrates MTS 10 in its off-loading configuration. Multiple views are used in order to clearly illustrate the features of MTS 10.

By way of an illustrative example, MTS 10 will be explained for its use as a mobile concrete transfer station that facilitates the transfer of wet concrete between dump trucks and ready mix concrete trucks. Accordingly, FIG. 1 illustrates MTS 10 configured for transport to/from a job site where the concrete transfer will occur, while FIGS. 2-5 illustrate MTS 10 at a job site. Although MTS 10 will be described for its use in a wet concrete transfer operation, it is to be understood that MTS 10 can be used to facilitate the transfer of any bulk flowable material (e.g., sand, gravel, grains, etc.) without departing from the scope of the present invention.

As will be explained later herein, a dump truck (not shown) is used to load MTS 10 with wet concrete when MTS 10 is configured as shown in FIGS. 2-4, and ready mix trucks (not shown) are used to off-load the wet concrete from MTS 10 when MTS 10 is configured as shown in FIG. 5. In general, MTS 10 is transported in its FIG. 1 configuration to/near a job site and then parked at/near the job site. Dump trucks are used to transport wet concrete from a concrete plant to MTS 10, and ready mix trucks are used to transport wet concrete from MTS 10 to precise dispensing locations at the job site. In this way, readily-available and cost-efficient dump trucks can be used to provide a steady/efficient supply of wet concrete to a job site, while only a small number of less-available and more costly ready mix trucks are needed at the job site for concrete mixing/adjusting just prior to dispensing/placement.

In order to be transportable on ground surfaces such as public roadways and private job-site roadways, MTS 10 in its FIG. 1 configuration defines a footprint projectable to a ground surface 100 that allows MTS 10 to be safely moved on roadways of interest. That is, in FIG. 1, MTS 10 is configured in its travel-ready configuration where none of MTS 10 extends outside of the projected footprint. However, when MTS 10 is in its site-ready and off-loading configurations shown in FIGS. 2-5, elements of MTS 10 will extend outside of transport-ready footprint.

Figure 6:
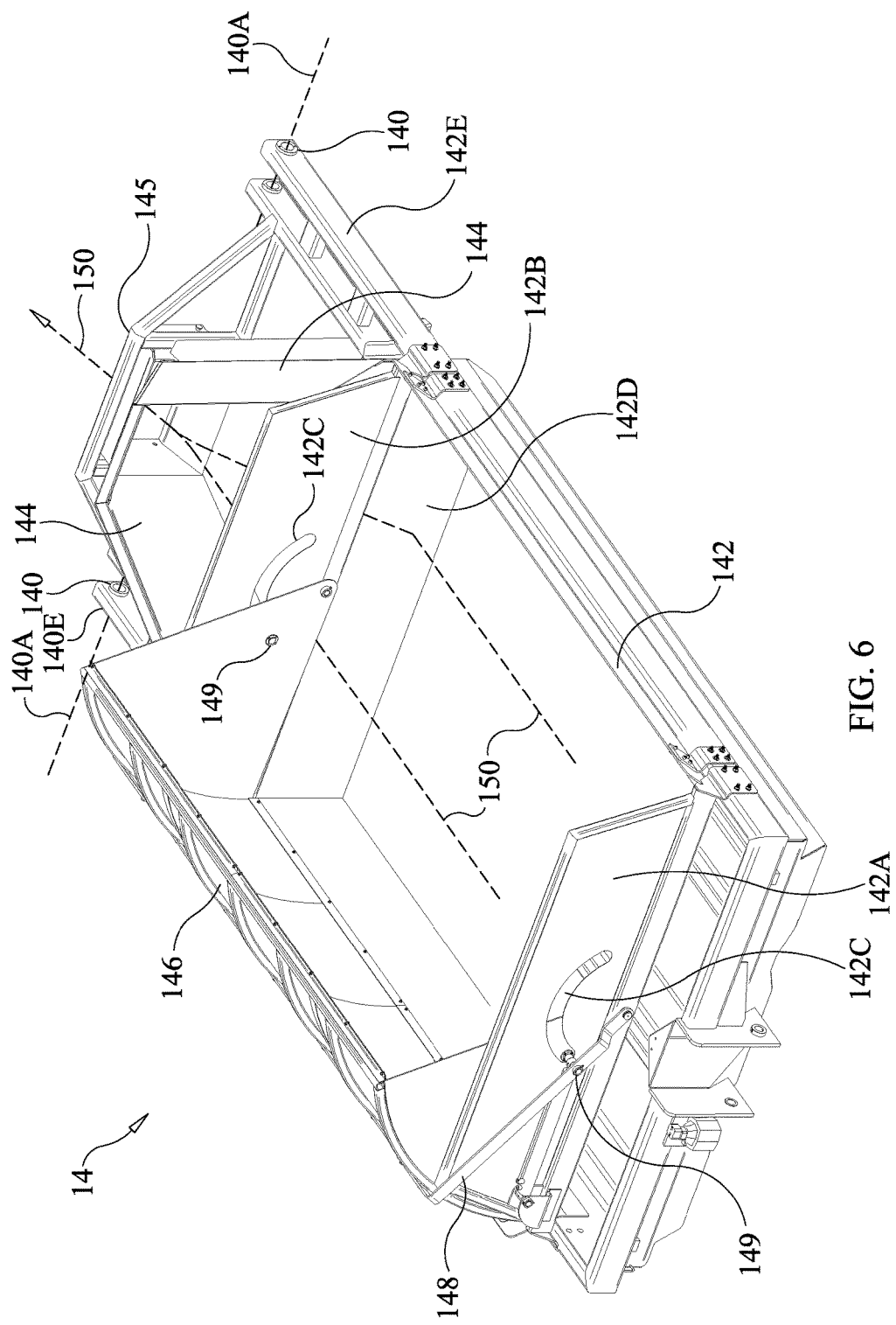
FIG. 6 is an isolated perspective view of an integrated hopper and chute assembly in accordance with an embodiment of the present invention.
Figure 7:
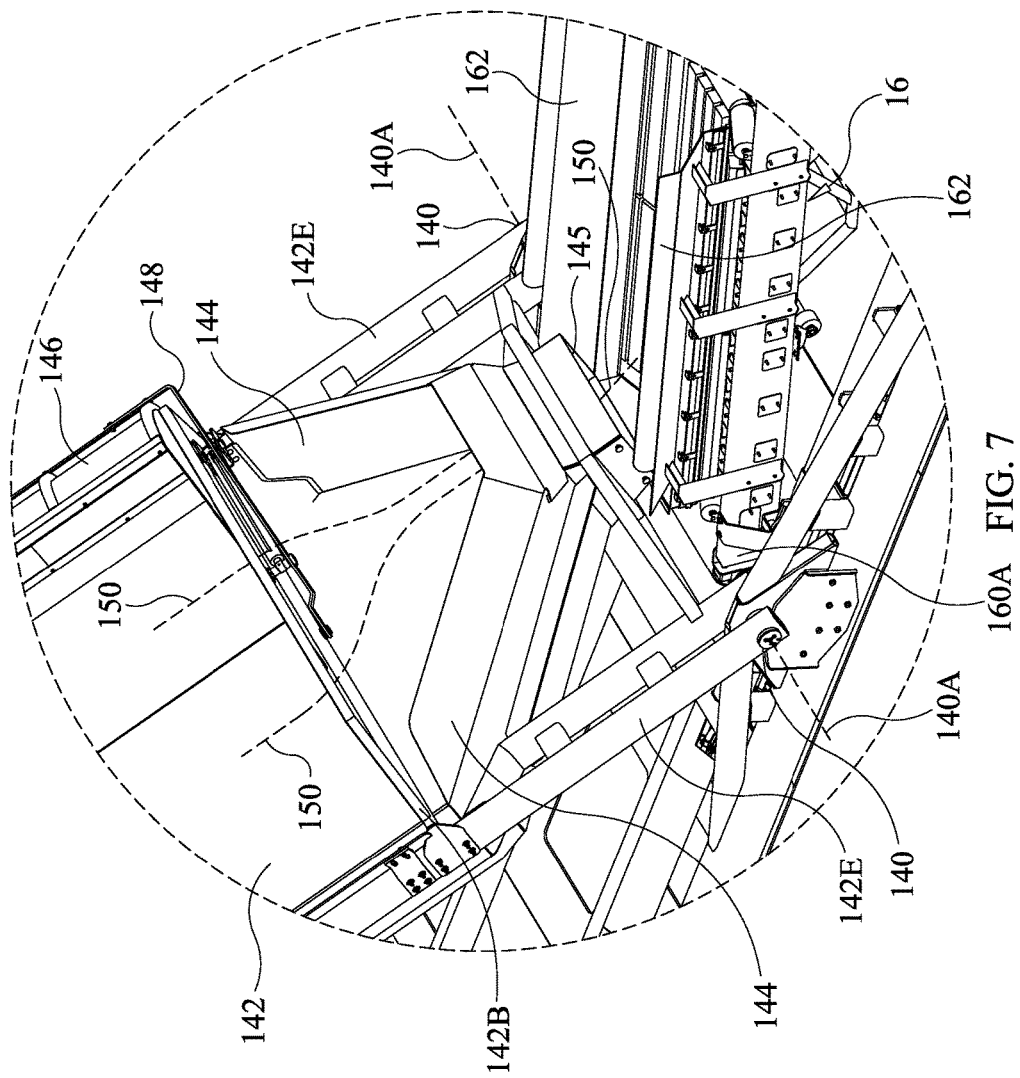
FIG. 7 is an enlarged perspective view of the chute interfacing with one end of the conveyor assembly when the hopper is in its raised position in accordance with an embodiment of the present invention.
Figure 8:
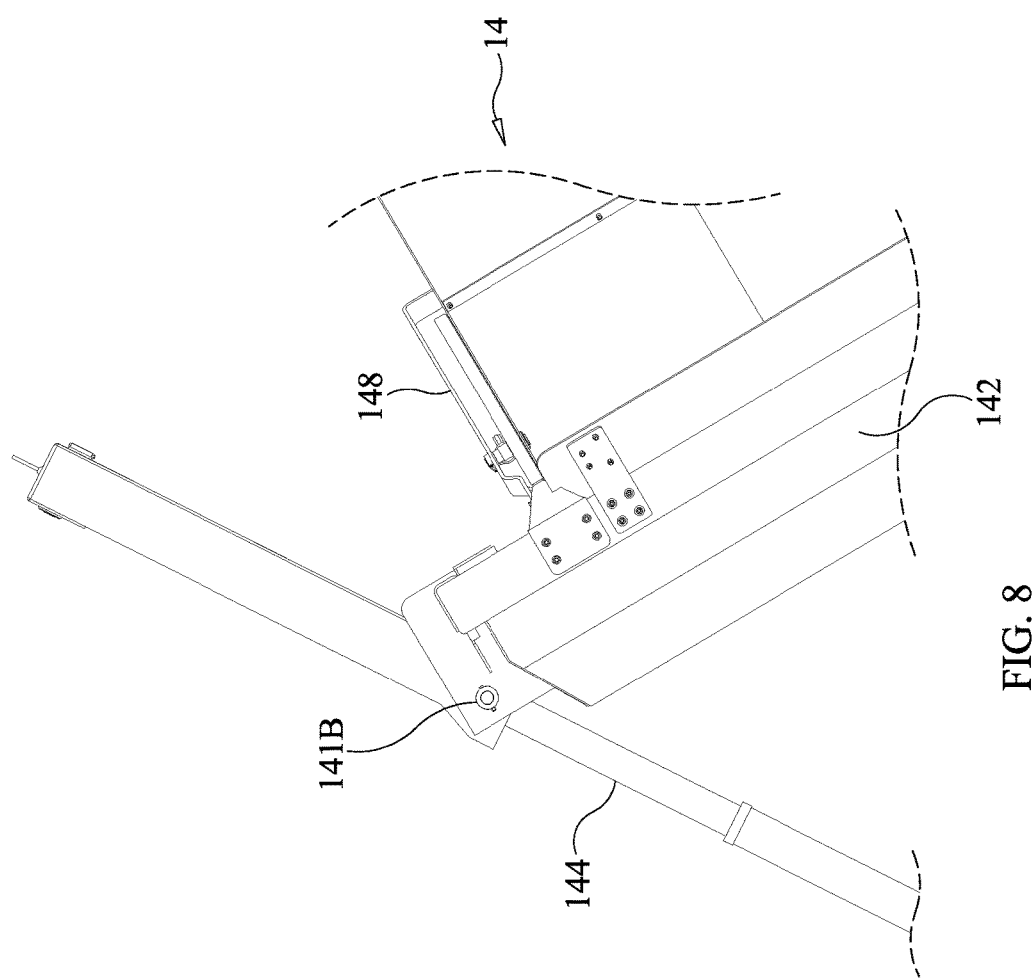
FIG. 8 is an enlarged and isolated view of a portion of the telescoping power cylinder and the hopper bed in their raised positions in accordance with an embodiment of the present invention.

To facilitate an understanding of the present invention, the ensuing description will make additional and simultaneous reference to FIGS. 6-8 where various subassemblies of MTS 10 are shown in isolation and in different views in order to more clearly illustrate the features thereof. It is to be understood that not every feature will be visible in every view so that simultaneous reference to the figures is necessary.

MTS 10 includes a trailer 12 that can be towed/driven to a job site and stabilized for a concrete transfer operation. Trailer 12 is generally a mobile trailer or flatbed that includes (among other things) a rigid trailer frame 120, wheels/tires 121 coupled to frame 120 at an aft end thereof for rolling support of trailer 12, and a tow coupling 122 coupled to frame 120 at a forward end thereof. Additional wheels/tires can be provided as needed without departing from the scope of the present invention. As used herein, the forward end and aft end of trailer frame 120 are defined relative to the direction of travel of trailer 12 when it is being towed behind a tow vehicle (not shown) coupled to tow coupling 122 and traveling in the vehicle's forward direction. It is to be understood that the functions of trailer 12 could also be provided by a self-contained motorized vehicle that includes a frame similar to frame 120 without departing from the scope of the present invention.

It is to be understood that the particular construction of trailer 12 is not a limitation of the present invention, and that trailer 12 can include additional features without departing from the scope of the present invention. For example, wheel chocks 123 can be provided and maintained at a position that does not engage ground surface 100 during transport of MTS 10 (FIG. 1), and deployed to engage ground surface 100 to provide guidance and control of a dump truck backing up to MTS 10 once MTS 10 is on site (FIGS. 2-5). The number, type, and placement of wheel chocks 123 can be other than shown without departing from the scope of the present invention. Although not shown, ground-surface-engaging stabilizing structures can also be coupled to trailer 12 without departing from the scope of the present invention.

Frame 120 provides the support for three major systems included in MTS 10. Briefly, the three major systems are an integrated hopper and chute assembly 14, a conveyor assembly 16, and power/control system(s) 18. Hopper and chute assembly 14 receives wet concrete from a dump truck (not shown) from either lateral side of trailer 12 and dispenses the wet concrete onto one end of conveyor assembly 16. Conveyor assembly 16 is collapsible to its transport-ready configuration (FIG. 1), extendable to its site-ready configuration (FIGS. 2-4), and tiltable to its off-loading configuration (FIG. 5). Power/control system(s) 18 include a variety of apparatus/systems for controlling the operation of hopper and chute assembly 14 and conveyor assembly 16 to thereby allow MTS 10 to be fully self-supportive in an operational sense. Power/control system(s) 18 can include, for example, generator(s), compressor(s), hydraulic reservoir(s), batteries, fuel tanks, fuel cells, and/or controllers. Power/control system(s) 18 could be mounted on a pallet 20 (mounted on the forward end of frame 120) to simplify removal, replacement, and/or repair of system(s) 18. For clarity of illustration, wires, conduits, etc., between power and control system(s) 18 and the powered/controlled elements of MTS 10 have been omitted.

Referring additionally to FIGS. 6 and 7, hopper and chute assembly 14 is pivotally coupled to frame 120 at a hinge point 140 provided at both lateral sides of frame 120. An imaginary line between the two hinge points 140 defines a hinging axis 140A for hopper and chute assembly 14. Hopper and chute assembly 14 can be moved between its lowered or concrete-loading position (FIGS. 2-4) to its raised or off-loading position (FIG. 5) using, for example, a telescoping power cylinder 141 coupled to trailer frame 120 and hopper and chute assembly 14. Additional power cylinders could be used without departing from the scope of the present invention. While the positioning of power cylinder 141 can be other that as shown without departing form the scope of the present invention, there are advantages to placing power cylinder 141 adjacent to a side of hopper bed 142 as will be explained later herein.

Hopper and chute assembly 14 includes a hopper bed 142 and an open-ended chute 144 rigidly coupled to hopper bed 142. Bed 142 is sized to hold a full load of wet concrete from a conventional dump truck, i.e., approximately 10 cubic yards. To help contain and prevent splashing of the wet concrete being dumped into bed 142, a shield 146 can be coupled to the fore and aft ends 142A and 142B, respectively, of bed 142. Shield 146 closes off one lateral side of bed 142 by extending up from bed 142 and partially hooding over bed 142, while leaving the other lateral side of bed 142 open to receive wet concrete from a dump truck. For example, shield 146 can be defined by a portion of a cylinder or clamshell. In order to be able to receive wet concrete from the other side of hopper bed 142, shield 146 is pivotally coupled to bed 142. For the illustrated embodiment, shield 146 is coupled to bed walls or ends 142A and 142B at pivot points 146A (FIG. 3) and 146B (FIG. 4), respectively. A drive arm 148 (FIGS. 3 and 6) is coupled to shield 146 and to pivot point 146B. Drive arm 148 is powered to control movement and position of shield 146. A guide pin 149 can be provided on drive arm 148 for tracking in and along a slot 142C defined in bed ends 142A and 142B. Drive arm 148 is moved to position shield 146 between the two lateral sides of bed 142 that are adjacent to aft bed end 142B.

The bottom of hopper bed 142 is aligned with an opening indicated at 142D defined in bed end 142B as illustrated in FIGS. 4 and 6. One end of chute 144 is rigidly coupled to bed 142 at aft bed end 142B such that a contiguous fluid communication is defined between the bottom of bed 142 and chute 144 via opening 142D. Chute 144 angles up from the bottom of bed 142 (e.g., typically an angle in the range of 15-35° relative to the bottom of bed 142) to the outboard end 145 of chute 144 that is always elevated above the start of conveyor assembly 16. The angle of chute 144 is selected to keep flowable material (not shown) in bed 142 from leaking out of outboard end 145 when hopper and chute assembly 14 is in its lowered position, and is selected to define the transition point/angle at which flowable material will begin to flow from outboard end 145 when assembly 14 moves from its lowered position to its raised position. By way of an illustrative embodiment, a chute angle of 22° allows material in bed 142 to begin flowing from outboard end 145 when bed 142 is raised up to form an angle of approximately 14° relative its lowered position.

In the illustrated embodiment, arms 142E rigidly couple bed 142 to hinge points 140 such that bed 142 and chute 144 move as an integrated unit as will be explained further below. When hopper and chute assembly 14 is in its lowered position where the bottom of bed 142 is essentially parallel to ground surface 100 (FIGS. 1-4), outboard end 145 of chute 144 is above opening 142D. However, when hopper and chute assembly 14 is rotated in unison about hinge points 140 to its raised position (FIG. 5), outboard end 145 of chute 144 is below opening 142D. The above-described angular relationship between bed 142 and chute 144 defines the transition point/angle at which material begins to flow from bed 142 and out of chute 144 as assembly 14 moves between its lowered position and raised position. In all positions of hopper and chute assembly 14, the fluid communication between bed 142 to chute 144, along chute 144, and from chute 144 via outboard end 145 remains open and unobstructed at all times as illustrated by dashed lines 150 in FIGS. 6 and 7. That is, no covers or valves are placed at opening 142D, anywhere along chute 144, or at outboard end 145 thereby eliminating any clogging or maintenance issues associated with such covers/valves. Chute 144 terminates in open outboard end 145 that fits inside of the sides of conveyor assembly 16 as assembly 14 is raised/tilted up to its off-loading position shown in FIGS. 5 and 7.

Conveyor assembly 16 is a collapsible assembly that, in the illustrated embodiment, is a folding conveyor hinged to fold onto itself to fit within the transport footprint of MTS 10 (FIG. 1), and opened/unfolded to its full operating length at a job site (FIGS. 2-5). Although not shown in the drawings, conveyor assembly 16 will include an endless belt as is well known and understood in the art. In general, conveyor assembly 16 includes a lower concrete-receiving portion 160 and an upper concrete-dispensing portion 161. When conveyor assembly 16 is configured for use at a job site, portions 160 and 161 define a contiguous conveyor bed using a conveyor drive and support, and a belt that can be folded and unfolded. Such foldable conveyor bed systems are known in the art. One end of concrete receiving portion 160 is hingedly coupled to frame 120 at a hinge 160A (FIG. 7). The hinging axis associated with hinge 160A can be aligned with or parallel to axis 140A defined between hinge points 140. Side splash guards 162 are coupled to concrete receiving portion 160 at the end thereof adjacent to chute 144. When hopper and chute assembly 14 is tilted up to off-load concrete onto portion 160, the above-described outboard end 145 of chute 144 is disposed within the space between splash guards 162. Portion 160 also has a rigid support 163 coupled thereto for the support of portion 161 in the transport-ready configuration (FIG. 1). A hinging mechanism 164 is used to hingedly couple portions 160 and 161. In general and as best illustrated in FIGS. 1 and 2, hinging mechanism 164 includes a hinge 164A and a power cylinder(s) 164B to control the hinging action. A variety of hinge mechanisms could be used without departing from the scope of the present invention.

In general, portion 161 extends from portion 160 such that their combination defines a concrete dispensing conveyor that carries wet concrete from portion 160 up and away from trailer 12 to allow a ready mix truck to position itself to receive wet concrete from portion 161. To facilitate an efficient transfer of wet concrete from portion 161 to a loading port of a ready mix truck, an open-ended, funneling tube 165 is coupled to the outboard end of portion 161. Tube 165 is wider at its top 165A than at its bottom 165B. The ultimate positioned height of bottom 165B for concrete off-loading is adjustable by means of a lift mechanism 166 coupled to trailer frame 120 and conveyor assembly 16. Lift mechanism 166 is any powered lift that can raise and lower conveyor assembly 16 between its transport-ready configuration (FIG. 1) and its desired height for an off-loading configuration (FIG. 5).

In operation, MTS 10 is driven/towed to a job site and stabilized on a ground surface. Conveyor assembly 16 is unfolded and raised to its concrete off-loading configuration. A dump truck filled with a load of wet concrete backs up to the open side of bed 142 when hopper and chute assembly 14 is in its lowered position. A ready mix truck positions its loading port beneath funneling tube 165. After bed 142 is filled with wet concrete, hopper and chute assembly 14 is tilted up to its raised position (FIG. 5) so that the wet concrete flows without obstruction onto portion 160 of conveyor assembly 16 (i.e., from bed 142, out opening 142D, and then onto, along and off chute 144). The wet concrete is conveyed along conveyor assembly 16 to tube 165 and ultimately into the ready mix truck. As the off-loading process is being completed, another concrete-filled dump truck positions itself adjacent to MTS 10. Once concrete off-loading is complete, hopper and chute assembly 14 is lowered and the process is repeated.

As mentioned above, there are advantages to positioning telescoping power cylinder 141 adjacent to a side of hopper bed 142. By not requiring power cylinder 141 to fit under or cooperate with the undercarriage of hopper bed 142, the bottom of hopper bed 142 can be shaped to minimize flow restrictions when hopper and chute assembly 14 is moved to its raised position where material is to flow from hopper bed 142 under the force of gravity. To facilitate such positioning of power cylinder 141, one end thereof is pivotally coupled to frame 120 at 141A as shown in FIG. 5, while an upper portion of power cylinder 141 is pivotally coupled to a side of hopper bed 142 at 141B as shown in FIG. 8 where hopper bed 142 is illustrated in its raised position. Pivot couplings 141A and 141B provide for titling movement of power cylinder 141 in a single plane of motion when hopper and chute assembly moves between its lowered and raised positions.

The advantages of the present invention are numerous. The mobile transfer station provides for efficient use of dump trucks for the delivery of bulk flowable material to a specific site where the material is to be re-dispensed. In terms of concrete transfer operations, the present invention facilitates efficient and cost-effective use of ready mix trucks for the tasks of adjusting, mixing, and dispensing of wet concrete at a job site. The integrated hopper and chute assembly provides low-maintenance bulk material receiving and discharge functions that facilitates efficient bulk material transfer to an onboard conveyor feeding a local material placement apparatus. By transferring wet concrete to ready mix trucks at a job site, adjustments to the concrete can be readily made prior to concrete placement thereby avoiding the problems associated with placing dump-truck-delivered concrete. The transfer station is readily transported and can be completely self-contained and self-supportive.

Although the invention has been described relative to a specific embodiment thereof, there are numerous variations and modifications that will be readily apparent to those skilled in the art in light of the above teachings. For example, the conveyor assembly of the present invention could be collapsible in ways other than folding/hinging. The conveyor assembly could be a non-folding conveyor without departing from the scope of the present invention. Other types of conveying apparatus could also be used to transfer concrete from the hopper and chute assembly to a ready mix truck. Still further, the conveying apparatus receiving the wet concrete from the hopper and chute assembly could be one designed to directly place the concrete at its ultimate location without departing from the scope of the present invention. The hopper and chute assembly's bed could be specially coated and/or equipped with vibrators or agitators to facilitate the off-loading process. The off-loaded concrete can be provided to ready-mix trucks as described, but could also be supplied directly to a variety of concrete placement apparatus to include concrete pumps, concrete pumper trucks, concrete conveyor trucks, etc. It is therefore to be understood that, within the scope of the appended claims, the invention may be practiced other than as specifically described.

What is claimed as new and desired to be secured by Letters Patent of the United States is:

1. A mobile transfer station for flowable material, comprising:
   a mobile frame;
   a conveyor having a first end coupled to said mobile frame and having a second end;
   a hopper having an open top and a bottom, said hopper mounted on said mobile frame, said hopper having a side wall with an opening passing there through;
   an open-ended chute having a loading end and a dispensing end, said loading end being rigidly coupled to said hopper at said opening thereof wherein said chute is in fluid communication with said hopper via said opening;
   said hopper being hingedly coupled to said mobile frame along a hinging axis and said dispensing end of said chute being positioned over said first end of said conveyor;
   a lift mechanism coupled to said mobile frame and said hopper for moving said hopper between a lowered position and a raised position wherein a combination of said hopper and said chute rotate about said hinging axis; and
   said chute being oriented at an angle with respect to said bottom of said hopper, wherein said dispensing end of said chute is above said loading end of said chute when said hopper is in said lowered position, and wherein said dispensing end of said chute is below said loading end of said chute when said hopper is in said raised position.

2. A mobile transfer station as in claim 1, further comprising a shield coupled to said hopper and extending up from said open top thereof, said shield partially hooding over said open top.

3. A mobile transfer station as in claim 2, wherein said shield is disposed on a lateral side of said hopper adjacent to said side wall of said hopper.

4. A mobile transfer station as in claim 2, wherein said shield is coupled to said hopper for movement between positions at opposing lateral sides of said hopper wherein each of said opposing lateral sides is adjacent to said side wall of said hopper.

5. A mobile transfer station as in claim 2, wherein said shield comprises a cylindrically-shaped wall.

6. A mobile transfer station as in claim 1, wherein said conveyor comprises a collapsible conveyor.

7. A mobile transfer station as in claim 1, wherein said lift mechanism is pivotally coupled to said mobile frame at a location adjacent to a side of said hopper and is pivotally coupled to said side of said hopper, wherein said lift mechanism tilts in a single plane when said hopper is moved from said lowered position to said raised position.

8. A mobile transfer station as in claim 1, wherein said opening is aligned with said bottom of said hopper.

9. A mobile transfer station as in claim 1, wherein said dispensing end of said chute transitions from being above said loading end of said chute to below said loading end of said chute as said hopper is moved between said lowered position and said raised position.

10. A mobile transfer station for flowable material, comprising:
    a mobile frame;
    a conveyor having a first end hingedly coupled to said mobile frame along a first hinging axis, said conveyor having a second end;
    a first lift mechanism coupled to said mobile frame and to said conveyor between said first end and said second end for raising and lowering said conveyor relative to said mobile frame;
    an integrated dispensing receptacle hingedly coupled to said mobile frame along a second hinging axis, said dispensing receptacle including a hopper and a chute, said hopper having an open top and having a side wall with an opening passing there through, said chute having a first open end and a second open end, said first open end being rigidly coupled to said hopper at said opening thereof wherein unobstructed fluid communication is maintained at all times between said hopper and said second open end of said chute, said second open end remaining open at all times and being positioned over said first end of said conveyor; and
    a second lift mechanism coupled to said mobile frame and said dispensing receptacle for moving said dispensing receptacle between a lowered position and a raised position wherein said dispensing receptacle rotates about said second hinging axis, wherein said second open end of said chute is above said first open end of said chute when said dispensing receptacle is in said lowered position, and wherein said second open end of said chute is below said first open end of said chute when said dispensing receptacle is in said raised position.

11. A mobile transfer station as in claim 10, wherein said first hinging axis is parallel to said second hinging axis.

12. A mobile transfer station as in claim 10, further comprising a shield coupled to said hopper and extending up from said open top thereof, said shield partially hooding over said open top.

13. A mobile transfer station as in claim 12, wherein said shield is disposed on a lateral side of said hopper adjacent to said side wall of said hopper.

14. A mobile transfer station as in claim 12, wherein said shield is coupled to said hopper for movement between positions at opposing lateral sides of said hopper wherein each of said opposing lateral sides is adjacent to said side wall of said hopper.

15. A mobile transfer station as in claim 12, wherein said shield comprises a cylindrically-shaped wall.

16. A mobile transfer station as in claim 12, wherein said conveyor comprises a folding conveyor.

17. A mobile transfer station as in claim 10, wherein said second lift mechanism is pivotally coupled to said mobile frame at a location adjacent to a side of said hopper and is pivotally coupled to said side of said hopper, wherein said second lift mechanism tilts in a single plane when said dispensing receptacle is moved from said lowered position to said raised position.

18. A mobile transfer station as in claim 10, wherein said opening is aligned with said bottom of said hopper.

19. A mobile transfer station as in claim 10, wherein said second open end of said chute transitions from being above said first open end of said chute to below said first open end of said chute as said dispensing receptacle is moved between said lowered position and said raised position.

20. A mobile transfer station for flowable material, comprising:
a mobile frame;
a conveyor having a first end coupled to said mobile frame and having a second end;
a hopper having an open top and a bottom, said hopper mounted on said mobile frame, said hopper having a side wall with an unobstructed opening passing there through;
a clamshell shield coupled to said hopper and extending up from said open top thereof, said clamshell shield hooding over a portion of said open top wherein a remainder of said open top remains uncovered along a lateral side of said hopper adjacent to said side wall with said opening;
an open-ended chute having a loading end and a dispensing end, said loading end being rigidly coupled to said hopper at said unobstructed opening thereof wherein said chute and said hopper are maintained in constant and unobstructed fluid communication with one another via said unobstructed opening;
said hopper being hingedly coupled to said mobile frame along a hinging axis, and said dispensing end of said chute remaining open at all times and positioned over said first end of said conveyor;
a lift mechanism coupled to said mobile frame and said hopper for moving said hopper between a lowered position and a raised position wherein a combination of said hopper and said chute rotate about said hinging axis; and
said chute being oriented at an angle with respect to said bottom of said hopper, wherein said dispensing end of said chute is above said loading end of said chute when said hopper is in said lowered position, and wherein said dispensing end of said chute is below said loading end of said chute when said hopper is in said raised position.

21. A mobile transfer station as in claim 20, wherein said clamshell shield is coupled to said hopper for movement between positions at opposing lateral sides of said hopper wherein each of said opposing lateral sides is adjacent to said side wall of said hopper.

22. A mobile transfer station as in claim 20, wherein said conveyor comprises a collapsible conveyor.

23. A mobile transfer station as in claim 20, wherein said lift mechanism is pivotally coupled to said mobile frame at a location adjacent to a side of said hopper and is pivotally coupled to said side of said hopper, wherein said lift mechanism tilts in a single plane when said hopper is moved from said lowered position to said raised position.

24. A mobile transfer station as in claim 20, wherein said unobstructed opening is aligned with said bottom of said hopper.

25. A mobile transfer station as in claim 20, wherein said dispensing end of said chute transitions from being above said loading end of said chute to below said loading end of said chute as said hopper is moved between said lowered position and said raised position.

26. A mobile transfer station as in claim 1, wherein said mobile frame is adapted to be positioned on a ground surface, and wherein said bottom of said hopper is parallel to the ground surface when said hopper is in said lowered position.

27. A mobile transfer station as in claim 1, wherein said angle is in the range of 15-35°.

28. A mobile transfer station as in claim 10, where said hopper has a bottom, and wherein said chute is oriented at an angle with respect to said bottom of said hopper.

29. A mobile transfer station as in claim 28, wherein said mobile frame is adapted to be positioned on a ground surface, and wherein said bottom of said hopper is parallel to the ground surface when said dispensing receptacle is in said lowered position.

30. A mobile transfer station as in claim 28, wherein said angle is in the range of 15-35°.

31. A mobile transfer station as in claim 20, wherein said mobile frame is adapted to be positioned on a ground surface, and wherein said bottom of said hopper is parallel to the ground surface when said hopper is in said lowered position.

32. A mobile transfer station as in claim 20, wherein said angle is in the range of 15-35°.

* * * * *